Dec. 24, 1963 R. L. TAUTY 3,115,321
QUICK-RELEASE FASTENING DEVICE FOR A PARACHUTE HARNESS
Filed Sept. 27, 1960 3 Sheets-Sheet 1
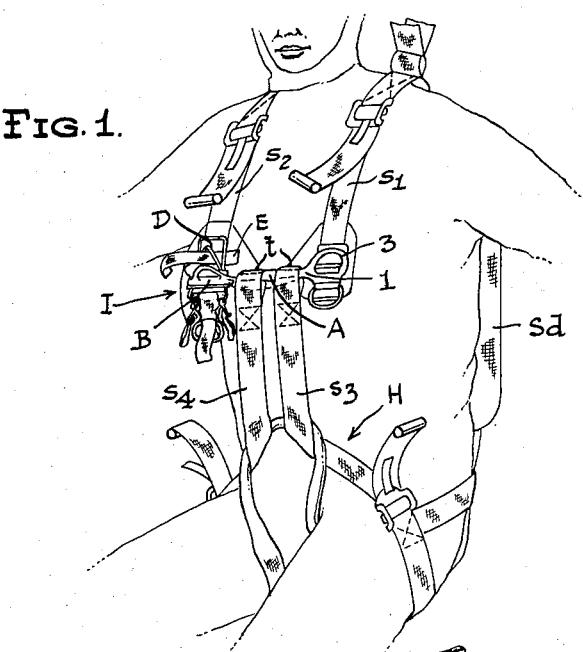
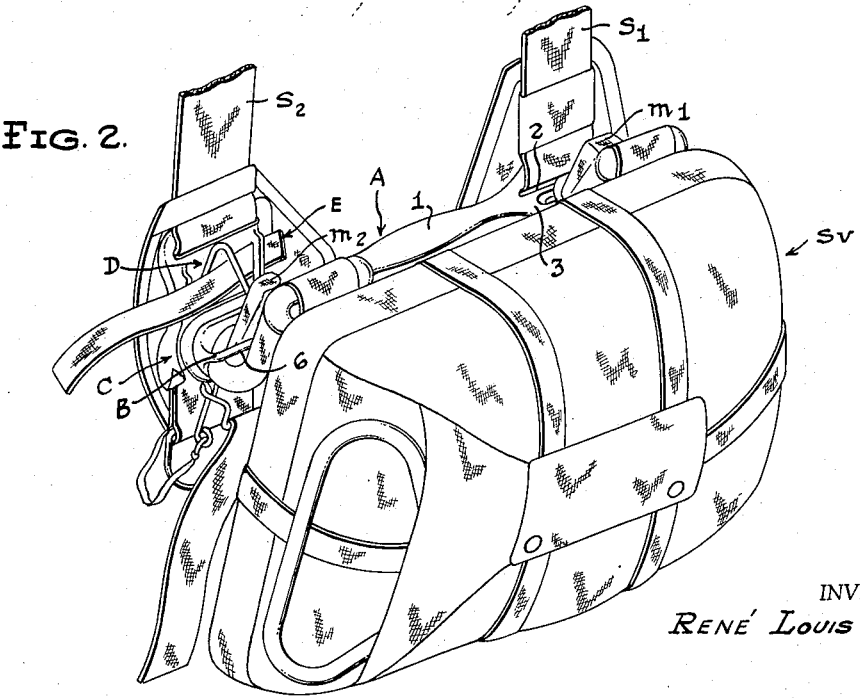
INVENTOR
RENÉ LOUIS TAUTY
BY E. M. Squire
ATTORNEY Dec. 24, 1963 R. L. TAUTY 3,115,321
QUICK-RELEASE FASTENING DEVICE FOR A PARACHUTE HARNESS
Filed Sept. 27, 1960 3 Sheets-Sheet 2
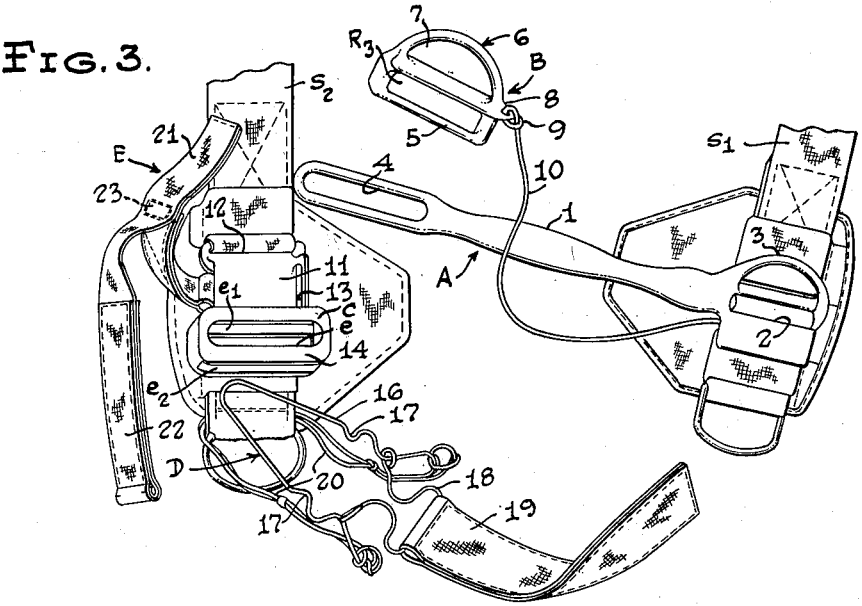
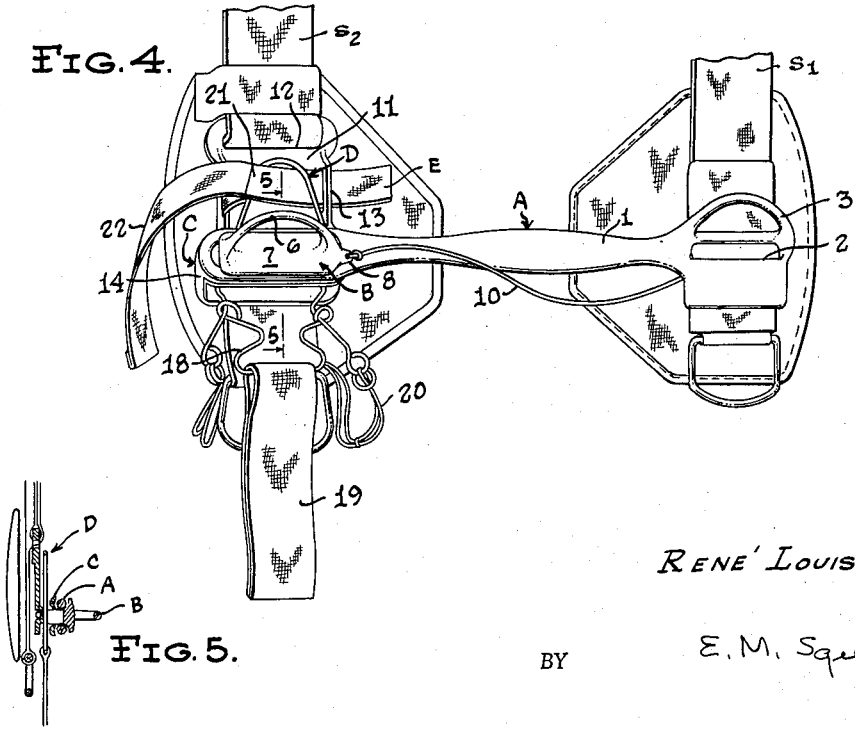
INVENTOR
RENÉ LOUIS TAUTY
BY E. M. Squire
ATTORNEY

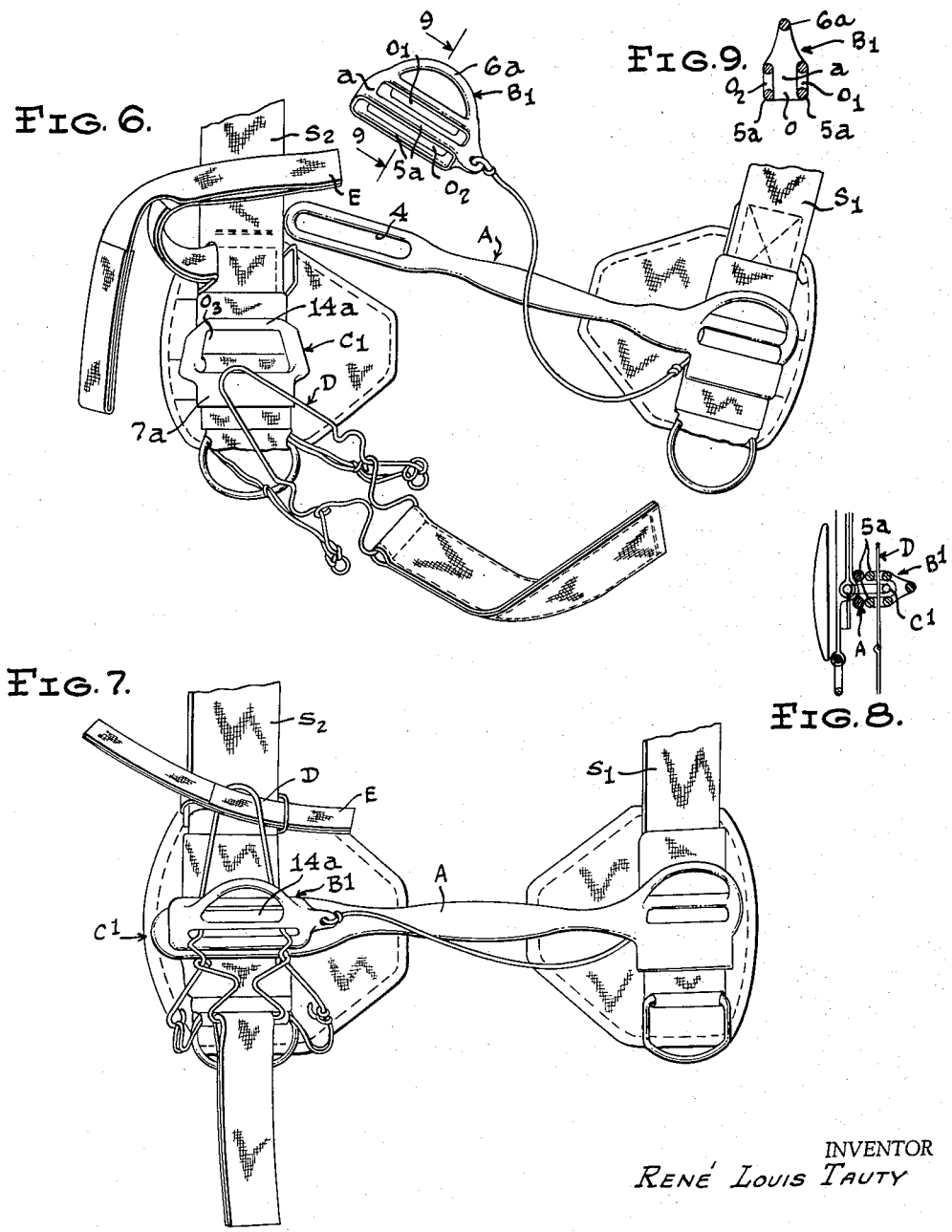

United States Patent Office 3,115,321
Patented Dec. 24, 1963

3,115,321
QUICK-RELEASE FASTENING DEVICE FOR A PARACHUTE HARNESS
René Louis Tauty, Stains, France, assignor to Etudes et Fabrications Aeronautiques, Paris, France, a French body corporate
Filed Sept. 27, 1960, Ser. No. 58,664
Claims priority, application France Mar. 25, 1960
4 Claims. (Cl. 244—151)

The present invention relates to parachute harnesses, including chest straps and seat straps, and more particularly, to quick-release fastening devices permitting to interconnect said straps on the wearer's chest, while enabling the latter as soon as he touches ground to free himself almost instantaneously from the harness by effecting two successive and very simple operations, so as not to be dragged on the ground by the open parachute canopy.

More specifically, the invention concerns a fastening device for parachute harness straps, of the type comprising a bar, permanently secured on one of the chest-straps and onto which the loops formed on the seat straps can be threaded, and a ring which is carried by the other chest strap and has said bar locked thereon by means of a resilient and pull-retractable latch.

In known devices of this type, the ring is permanently secured on the second chest-strap and any untimely release of the harness owing to a premature retraction of the latch is safely precluded by means of an auxiliary latching of the bar on the ring effected by one of the snap hooks securing the container of the lap parachute said snap hook being engaged on the ring over the bar.

With this arrangement, the two operations required for the release of the harness comprise; unhooking the snap-hook secured to the ring of the removable fastening device over the bar thereof, thus releasing the container of the lap parachute at one side, and thereafter, retracting the resilient latch.

The first of these operations is not very easy since the snap hook is of relatively difficult access. In any case, the aforesaid design requires in order to ensure an adequate harness-buckling safety the necessity of providing a lap parachute.

The present invention has for its object an improved quick and total-release fastening device for a parachute harness, whose buckling does not require the compulsory presence of the container of a lap parachute and whose release, when such a container is provided, can be effected very rapidly without having to release said container of the harness.

The invention has also for its object an improved fastening device which is of the aforesaid type having a bar with an eye formed therein, a ring and a resilient locking latch of the bar relative to the ring, and in which said ring is removable and includes a flange or seat portion forming therewith a kind of a free bolt nab, this bolt nab being combined with a staple, adapted to be secured on the harness and in relation of which said resilient latch when extended through this staple and the ring enables the bar eye to be immobilized between the bolt nab and the staple, and with a retractable auxiliary safety latch which is adapted, when in operative position, to lock the resilient latch extending through the staple and the bolt nab ring.

Owing to this arrangement, the buckling and the release of the parachute harness are no longer dependent on the presence of a lap parachute container and the two sequential operations required to release the harness are upheld since they are respectively corresponding to successive and independent retractions of the auxiliary latch and then of the resilient latch.

In accordance with a further preferred feature, the bolt nab is provided on the seat portion thereof, at the opposite side of the ring cooperating with the staple, with an auxiliary ring adapted to hook thereon a snap hook for the container of the lap parachute or another appliance included in the wearer's equipment.

The improved fastening device thus gives the possibility, inter alia as is the case with the conventional devices, of providing a lap parachute container but it will be stressed once more that this appliance is merely optional.

The invention has also for its object a parachute harness, which is equipped with the aforesaid improved quick and total-release fastening device.

Further features will become apparent from the ensuing description, when read in connection with the accompanying drawings, given merely by way of an example and in which:

FIG. 1 is an isometric view of a harness provided with the improved fastening device according to the invention and adapted to buckle said harness;

FIG. 2 is an isometric view, drawn on a larger scale, of this device having the lap parachute container suspended thereon;

FIG. 3 is an isometric view of the fastening device shown in unbuckled position;

FIG. 4 is a similar view but with the harness buckled;

FIG. 5 is a diagrammatic cross-sectional view taken through the base, the ring and the bar, which are assembled by the resilient latch, said section being taken through the line 5—5 of FIG. 4;

FIGS. 6, 7 and 8 are similar views respectively to FIGS. 3, 4 and 5 but showing an alternative embodiment, and FIG. 9 is a cross-sectional view taken along line 9—9 of FIG. 6.

In accordance with the embodiment shown in FIGS. 1 to 4, the improved quick and total-release fastening device I is applied to a harness H of conventional design, which is adapted to secure on the back of the wearer the container $Sd$ of a back-type parachute, a container $Sv$ enclosing a lap parachute (FIG. 2) being optionally hookable on said harness H, after the latter has been buckled by means of the fastening device I.

The harness H comprises as known per se, two chest straps $s_1$ and $s_2$ and two seat straps $s_3$ and $s_4$, these four straps being connectable by means of the fastening device I.

The latter consists essentially of five parts:

A small bar A, secured to the chest-strap $s_1$;
A removable ring or bolt nab B;
A staple C secured to the second chest strap $s_2$;
A main resilient latch D; and
An auxiliary latch E, adapted to lock the latch D in the locking position of the bolt nab B in the staple C.

This bolt nab is adapted to immobilize between itself and the staple, the bar A, this being the opposite to the provisions of the conventional devices wherein the ring is directly secured to the strap $s_2$, which has no staple associated therewith, and wherein the latch D merely locks on this ring the bar A, the necessary safety being ensured by the hooking to the ring of the container $Sv$ of the lap parachute over the bar.

Next, the bar A which is of a conventional design is formed of a rigid metal rod 1 having at its end secured to the strap $s_1$ an eye 2 for the passage therethrough of the strap, and a forwardly-projecting half-ring 3 which is adapted, as usual, to have the container $Sv$ of the lap parachute hooked thereon, by means of a first snap hook $m_1$.

At the other end thereof, the bar 1 is provided with an elongated eye 4. This eye has a shape such that the bolt nab B can be partly engaged therethrough by a semi-annular portion 5 thereof.

This bolt nab B does not only include the main half-ring 5, but also a second half-ring 6, both these rings being connected to a separating flange member 7 which completes these half-rings to provide a pair of true rings.

The ring formed by the half-ring 6 and the flange 7 is adapted to have hooked thereon by means of a second snap hook $m_2$ (FIG. 2) the container $Sv$ of the lap parachute.

The half ring 5 is an element of the bolt nab B and, in combination with the flange 7, is adapted to ensure the locking of the bar A in the staple C.

Preferably and as is shown, the bolt nab B carries laterally as an extension of the flange 7 thereof, a lug 8 having a hole 9 formed therein adapted to have secured thereon a protectively coated cable or another flexible tie means 10, enabling the bolt nab B to be connected to the extremity of the bar A, on the side where the latter is fixed to the strap $s_1$, this tie 10 which leaves the bolt nab entirely free, prevents it from being lost when the harness is unbuckled.

The staple C includes a base 11 provided with an eye 12 for the securement to the chest strap $s_2$ of the harness H, and laterally with a second eye 13, adapted to cooperate with the auxiliary latch E, whereas a bridge 14 is projecting from the base 11 and has, formed therein an elongated middle opening $e$ (FIG. 3), whose plane is parallel with the base 11, and the two lateral parallel openings $e_1$ and $e_2$ whose planes are perpendicular to the base 11, the middle opening $e$ forming the inlet of the staple and having the ring 5 of the bolt nab B engageable therethrough, so that the opening $R_3$ of the bolt nab B register with the two lateral openings $e_1$, $e_2$ of the staple C, and the three openings $e_1$, $R_3$, $e_2$ thus being in alignment provide a free passage for the main latch D which can be threaded through the said three openings.

This latch is of a known design, comprising a length of piano string 16 folded on itself to form a kind of spatula, the forward portion of which provides a V-shape followed by two bent portions 17, adapted to abut the ring 5, whereas at the rear, a loop 18 accommodates a tape length 19 forming a handle and enabling a pull to be exerted on the latch D.

In order to prevent said latch from getting lost, two strings of ample length 20 tie it to the end of the strap $s_2$.

Finally, the auxiliary latch E is formed by a short length 21 of rigid strap material or any other suitable material, which is threadable through the end of latch D and through the eye 13 of the seat portion of the staple, a short tape 22 forming a pull-handle being stitched at 23 or otherwise secured on the latch E.

The device is operated as follows. Assuming the various parts to be separated as shown in FIG. 3, the straps $s_1$, $s_2$, $s_3$, and $s_4$ of the harness H are free and the harness can be buckled on the body of the wearer, the chest straps $s_1$, and $s_2$ being folded forwardly and downwardly while the seat straps $s_3$ and $s_4$ are brought upwards after having been threaded through the seat loop of the harness, so that the bar A can be engaged into a pair of loops $t$ provided at the ends of straps $s_3$ and $s_4$.

Once this operation is completed, the bolt nab B is threaded by its loop 5 into the eye 4 of the bar A, then into the opening $e$ of the staple C, whereby the peripheral portion of the eye 4 of the bar A is housed between the seat 7 of the bolt nab B and the top of the bridge 14 of the staple C. The main latch D is thereafter upwardly inserted under the guard 14 of the staple through the aligned openings $e_1$, $R_3$, $e_2$, so that this latch does not only extend through this staple but also through the ring 5 of the bolt nab B engaged in this staple. Thus, the latch D takes the position shown in FIGS. 1, 2 and 4 and the bolt-nab B is locked to the staple C.

The necessary safety is provided by the engagement of the auxiliary latch E, playing the part of a safety pin extending through the end of the latch D and through the eye 13 of the staple C.

The buckling of the harness, which has thus been achieved, is absolutely independent from the presence or the absence of the container $Sv$ for the lap parachute; if present, the lap parachute container is thereafter hooked by means of the snap hooks thereof $m_1$ and $m_2$, to the ring 3 of bar A and to the auxiliary ring 6 of the bolt nab B, respectively.

As soon as the wearer touches ground, he must as is well known free himself of the open back type parachute, whose canopy may drag him on the ground; this implies the necessity of freeing himself almost instantaneously of the harness H, without risking, however, that this harness loosens during the descent following some untimely or premature operation effected by the wearer.

This unbucking operation requires two successive steps, at least the second of which is necessarily deliberate.

The first step comprises pulling laterally on the handle 22, to release the auxiliary latch E, which in turn releases the main latch D;

The second step comprises pulling by means of the handle 19 on the latch D to release it from the staple, which automatically results in a release of the bolt nab B from the staple, and thereafter from the eye 4 provided in the bar A.

The wearer is now free from the harness without having had to act on the snap hook $m_2$ of the lap parachute container $Sv$, which container may remain connected to the bolt nab B by said snap hook $m_2$, this bolt nab remaining in any case tied to the strap $s_1$ of the harness H, by means of the flexible tie member 10, and thus cannot be lost.

In FIGS. 6 and 7, there is shown an alternative embodiment or a modification, in which the bar A, the main latch D and the auxiliary latch E are identical to those illustrated in the first exemplary embodiment.

However, in this case, the bolt nab B of FIG. 3 is replaced by a female member $B_1$ which is shown in perspective view, in FIG. 6 and, sectionally, in FIG. 9, and the female staple member C of FIG. 3 is replaced by a male member $C_1$.

The member B comprises an elongated cylindrical portion $a_1$ having a middle opening $o_1$ of elongated shape, this cylindrical portion comprising two substantially plane lateral portions $5^a$, $5^a$ parallel with one another, and having elongated parallel lateral openings $o_1$ and $o_2$, whereby these portions $5^a$, $5^a$ constitute two lateral elongated parallel twin rings replacing the single main ring 5 of the bolt-nab B of FIG. 3. This member $B_1$ is thus symmetrical, and, in its plane of symmetry is fixed a curved member $6^a$ having substantially the shape of a half ring, like the member 6 of FIG. 3. The bridge 14 of the staple C is replaced by a bridge $14^a$ which is of narrower configuration and has an opening $o_3$ and a flange or seat portion $7^a$, this bridge being engageable through the opening $o$ between the two twin rings $5^a$ of the bolt nab $B_1$, so that the opening $o_3$ registers with the openings $o_1$ and $o_2$ of the bolt-nab and these three openings provide a free passage for the main latch D.

Thus it is the bolt nab $B_1$ which rides over the ring $14^a$ of the staple $C_1$, as can be seen in FIGS. 7 and 8, the latch D passing through openings $o_1$, $o_3$ and $o_2$ and the bar A is captive between the seat $7^a$ of the staple $C_1$ and the parallel lateral portions or rings $5^a$, $5^a$ of the bolt nab $B_1$.

The behaviour of this device is the same as in the first-described embodiment.

It is to be understood that the invention is not confined to the described and illustrated embodiments which have been chosen merely by way of examples. Thus, for example, the auxiliary safety latch E may be comprised by any mechanical means other than the safety strap which has been described and illustrated.

Having now described our invention what I claim as new and desire to secure by Letters Patent is:

1. Quick and total-release fastening device for parachute harness straps, this device comprising, in use: a bar having an eye at one end thereof whereas its other end is secured to one of the harness straps, a removable bolt-nab and a staple member, one of the two latter parts being a male part, the other part being a female part; the staple being secured on another strap of the harness; said male part comprising an apertured portion having a lateral opening at one end thereof and a seat portion on its opposite end, and said female part having a middle portion having a middle opening through which said apertured portion of said male part is adapted to extend, and two lateral parallel portions having respectively two aligned lateral openings; said bar being so engaged on said middle portion of said female part as to have said eye in register with said middle opening, and said apertured portion of said male part being threaded through said eye and said middle opening, said eye of said bar being thus inserted between said middle portion of said female part and said seat portion of said male part, and said lateral opening of said male part registers, at least partially, with said two lateral openings of said female part; a resilient latch means extending through said three registering lateral openings thereby immobilizing relative to said staple both said bolt-nab and said bar; and a retractable auxiliary safety latch means inserted through said resilient latch means.

2. Quick and total-release fastening device for parachute harness straps according to claim 1, wherein one of said male and female parts, which constitutes the removable bolt-nab, further comprises an auxiliary ring, whereby the container of a lap pack parachute can be secured to said removable bolt-nab.

3. Quick and total-release fastening device for parachute harness straps according to claim 1, wherein said male member is said removable bolt-nab and further comprises an auxiliary ring, whereby the container of a lap pack parachute can be secured to said removable bolt-nab.

4. Quick and total-release fastening device for parachute harness straps according to claim 1 wherein said female member is said removable bolt-nab and further comprises an auxiliary ring whereby the container of a lap pack parachute can be secured to said removable bolt-nab.

References Cited in the file of this patent

UNITED STATES PATENTS

| 1,050,874 | Twombly | Jan. 21, 1913 |
| 2,527,972 | Tauty | Oct. 31, 1950 |

FOREIGN PATENTS

| 1,200,230 | France | June 29, 1959 |